United States Patent [19]
Goedken et al.

[11] Patent Number: 5,185,566
[45] Date of Patent: Feb. 9, 1993

[54] METHOD AND APPARATUS FOR DETECTING THE STATE OF CHARGE OF A BATTERY

[75] Inventors: Terrance J. Goedken, Schaumburg, Ill.; James F. Goedken, Dubuque, Iowa

[73] Assignee: Motorola, Inc., Schaumburg, Ill.

[21] Appl. No.: 794,632

[22] Filed: Nov. 18, 1991

Related U.S. Application Data

[63] Continuation of Ser. No. 519,531, May 4, 1990, abandoned.

[51] Int. Cl.⁵ .......................... H01M 10/44
[52] U.S. Cl. ............................ 320/48; 320/20
[58] Field of Search .................... 320/20, 48

[56] References Cited

U.S. PATENT DOCUMENTS

| 3,911,349 | 10/1975 | Seeley et al. | 320/20 |
|---|---|---|---|
| 3,992,658 | 12/1976 | Bechtold et al. | 320/20 |
| 4,024,523 | 5/1977 | Arnold et al. | 320/48 |
| 4,025,916 | 5/1977 | Arnold et al. | 320/48 |
| 4,333,149 | 6/1982 | Taylor et al. | 320/48 |
| 4,380,726 | 4/1983 | Sado et al. | 320/48 |
| 4,388,582 | 6/1983 | Saar et al. | 320/20 |
| 4,392,101 | 7/1983 | Saar et al. | 320/20 |
| 4,503,378 | 3/1985 | Jones et al. | 320/20 |
| 4,602,204 | 7/1986 | Hase | 320/48 |
| 4,746,852 | 5/1988 | Martin | 320/20 |
| 4,767,977 | 8/1988 | Fasen | 320/20 |
| 4,820,966 | 4/1989 | Fridman | 320/48 |
| 4,929,931 | 5/1990 | McCuey | 320/48 |
| 4,958,127 | 9/1990 | Williams et al. | 320/48 |

FOREIGN PATENT DOCUMENTS

| 0094685 | 11/1983 | European Pat. Off. | 320/48 |
|---|---|---|---|
| 0164890 | 12/1985 | European Pat. Off. | 320/48 |
| 2159671 | 12/1985 | United Kingdom | 320/48 |
| 2167617 | 5/1986 | United Kingdom | 320/48 |
| 2185326 | 7/1987 | United Kingdom | 320/48 |
| 8805222 | 7/1988 | World Int. Prop. O. | 320/48 |

OTHER PUBLICATIONS

"Available Battery Time Sensor" by F. A. Ferraiolo and A. E. Gass, IBM Technical Disclosure Bulletin, vol. 16 No. 5, Oct. 1973.

Primary Examiner—R. Skudy
Assistant Examiner—Thomas M. Dougherty
Attorney, Agent, or Firm—Robert H. Kelly

[57] ABSTRACT

A method and apparatus for detecting the state of charge of a battery during charging or discharging thereof. Voltage levels across the battery are measured during battery charging or discharging, and compared with preset values representative of a normal battery characteristic charge or discharge curve. The normal charge or discharge curve is modified responsive particular battery characteristics indicated by measured battery voltage levels, and, preferably, also responsive to measured battery temperature levels to form a modified normal battery charge or discharge curve. The modified normal battery charge or discharge curve is divided into curve portions defined by voltage levels and rates of changes of the voltage levels. Each curve portion defines a particular state of charge of the battery. Measured voltage levels and rates of changes thereof may then be associated with a modified normal battery charge or discharge curve portion and a particular state of charge or discharge curve portion and a particular state of charge defined thereby.

7 Claims, 4 Drawing Sheets

METHOD AND APPARATUS FOR DETECTING THE STATE OF CHARGE OF A BATTERY

This is a continuation of application Ser. No. 519,531, filed May 4, 1990, and now abandoned.

BACKGROUND OF THE INVENTION

The present invention relates generally to batteries, and, more particularly, to a method and apparatus for identifying the state of charge of a battery during charging or discharging thereof.

A portable, battery power source is required in order to power an electrical energy-consuming device which cannot be positioned proximate to a permanent power supply. As the battery power source is carried with the electrical device which the battery power source powers, it is desirable to minimize both the size and the weight of the battery. For instance, the battery used to power a cellular phone is carried with the phone. In order to minimize the size and weight of the phone and battery package, it is desirable to utilize a small, lightweight battery. However, size and weight minimization limits the energy storage capacity of the battery.

Use of the device powered by the battery discharges the stored energy of the battery, thus depleting the battery of stored energy, necessitating replacement of the battery. The frequency with which the battery must be replaced is, of course, dependent upon the battery capacity, the energy required to operate the electrical device, and the frequency with which the electrical device is operated.

Nickel-cadmium (Ni-Cd) batteries have been developed and are widely used as portable battery power sources for the reason that a Ni-Cd battery, once depleted of stored energy, may be recharged simply by connecting the battery to a suitable charging current source for a period of time. Battery charging apparatus are known to permit such recharging. A nickel-cadmium battery may be recharged as many as five hundred, or more, times, and this battery type is additionally advantageous for the reason that the charging rate at which the battery is recharged may be relatively high (i.e., "fast charging" of the battery is permitted) in order to recharge the battery in a short period of time.

However, when charging a Ni-Cd battery, care must be exercised in order to ensure that fast charging is terminated once the Ni-Cd battery has been fully charged. Otherwise, the battery may become damaged. A user, however, also desires to ensure that the battery is fully charged. Otherwise, soon after the battery is connected to power the electrical device, the battery energy becomes depleted, and the battery must be replaced again.

It is therefore of significant value to accurately detect the amount to which the battery has been charged (i.e., detect the state of charge of a battery) during recharging of the battery.

Several methods and apparatus have been developed in order to detect the state of charge of a battery power source during the recharging thereof. One such method is merely to measure the voltage of the battery during recharging thereof and then to provide a display of the measured voltage levels. One apparatus operative to carry out such a method to detect and display the measured voltage levels of the battery power source is a bar display driver such as a National Semiconductor Corporation LM3914 Dot/bar display driver and a suitable output display device coupled thereto. The MOLICEL (TM) evaluation kit, produced by Moli Energy Limited of Burnaby, British Columbia, Canada for MOLICEL rechargeable battery packs, incorporates such a driver. However, this existing method and associated apparatus fails to make adjustments responsive to particular battery characteristics, such as, e.g., battery age, manufacture, and ambient conditions. Inaccurate detections of states of charge result.

Another method for detecting the state of charge of a battery involves measuring the current supplied to the battery during charging of the battery, and measuring current output by the battery during discharging of the battery. By maintaining records of both the amount of current supplied to and output by the battery, the state of charge of the battery is determined. However, this method requires constant monitoring of the battery in order to create and maintain such records. Such constant monitoring is, in many instances, impractical.

A method and apparatus for detecting the actual state of charge of a battery power source which is both accurate and easily obtained is therefore required.

Additionally, an indication of the state of charge of a battery power source during use of an electrical device to which the battery power source is connected, i.e., during discharge of the battery power source, is beneficial in order to provide to a user of an electrical device an indication of the extent to which the battery has been discharged. An early indication that the battery energy levels have been depleted to a critical level allows the user to replace the battery prior to failure of the device. Because a battery characteristic discharge curve is merely the reverse of a battery characteristic charge curve, the battery characteristic discharge curve is also nonlinear. Existing methods and apparatus for detecting and indicating the state of charge of a battery during discharge thereof are similarly inherently inaccurate.

SUMMARY OF THE INVENTION

It is accordingly an object of the present invention to provide a method and apparatus for detecting the state of charge of a battery during charging or discharging thereof which overcomes the existing problems associated with inaccurate state of charge detections.

It is a further object of the present invention to provide a method and apparatus for detecting the state of charge of a battery during charging or discharging thereof which adjusts a state of charge detection responsive to characteristics of the particular battery being charged or discharged.

In accordance with the present invention, a battery state of charge detector for detecting the state of charge of a battery, and associated method, is disclosed. At least one rate of change of at least one battery charge condition characteristic is determined. This determined rate of change is compared with at least one preset rate of change, and the state of charge of the battery is identified responsive to the comparison.

BRIEF DESCRIPTION OF THE DRAWINGS

The present invention will be better understood when read in light of the accompanying drawings in which.

DESCRIPTION OF THE PREFERRED EMBODIMENTS

Figure 1:
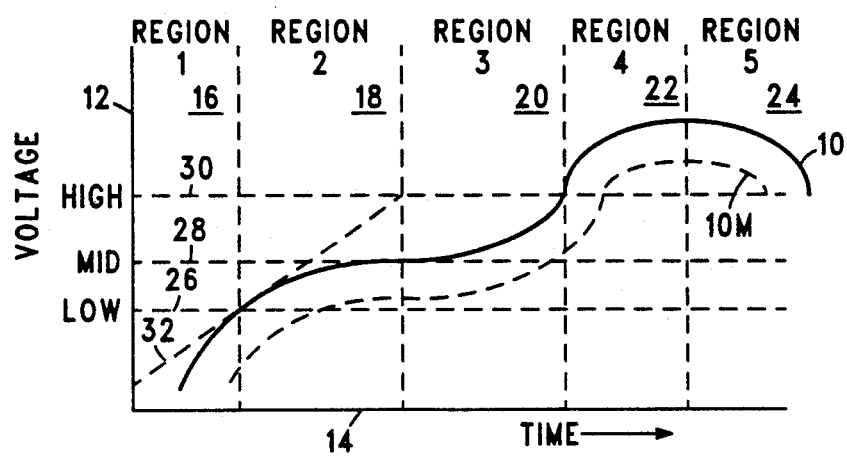
FIG. 1 is a graphical representation of a normal battery characteristic charge curve wherein voltage levels measured across the battery are plotted as a function of time during charging of the battery.

Referring first to the graphical representation of FIG. 1, there is shown a normal battery characteristic charge curve, referred to generally by reference numeral 10, representative of a typical Nickel-Cadmium battery during charging thereof. Curve 10 is created by plotting voltage levels measured across a battery as a function of time during charging of the battery. As illustrated, voltage levels are plotted along ordinate axis 12 as a function of time, represented by axis 14. During charging of a battery, the voltage level across the battery generally increases over time; however, and as illustrated by curve 10 of FIG. 1, the increase in voltage levels is nonlinear. A particular battery has a charge curve similar to that of curve 10. However, the voltage positioning of the curve (i.e., the position of the curve relative to axis 12) differs for different batteries due to particular battery characteristics, such as, e.g., battery age, manufacture, and ambient conditions. Known methods and apparatus for providing indications of states of charge of the battery responsive solely to comparisons of measured voltage levels with preset magnitudes are therefore inherently inaccurate.

The charge detector of the present invention utilizes the characteristic shape of a typical battery charge curve, such as curve 10, and then modifies the position of the curve with respect to axis 12 in order to provide an accurate indication of the state of charge of the battery. As a battery discharge curve is merely the mirror image of the charge curve, the present invention may similarly provide an accurate indication of the state of charge of a battery during discharging thereof. While the following description describes the state of charge detector with respect to a battery during charging thereof, it is to be understood that the state of charge detector of the present invention may be similarly utilized to detect the state of charge of a battery during discharging thereof.

Charge curve 10 may be divided into portions, with the component portions being defined corresponding to their relative position on the voltage-time plot 12-14 of FIG. 1. As illustrated, the voltage-time plot 12-14 is divided into regions, and, in the preferred embodiment, the plot is divided into five regions—first region 16, second region 18, third region 20, fourth region 22, and fifth region 24. The regions are defined, as will be described more fully hereinbelow, by low voltage, mid-voltage, and high voltage levels 26, 28 and 30, respectively, and the magnitude of the slope of line 32. Greater or fewer numbers of regions may be defined as desired.

A determination of the state of charge of a battery is made by determining, by measuring the voltage levels across the battery and the rates of changes thereof, in what region the battery lies. By correlating actual measured voltage levels across a battery to a location on curve 10, inaccuracies associated with known state of charge detection methods are avoided. Furthermore, because the regions are defined with respect to a rate of change of voltage (i.e., relative to the slope of line 32) in addition to measured voltage levels, the detector of the present invention can more accurately detect the true state of charge of the battery.

Figure 2:
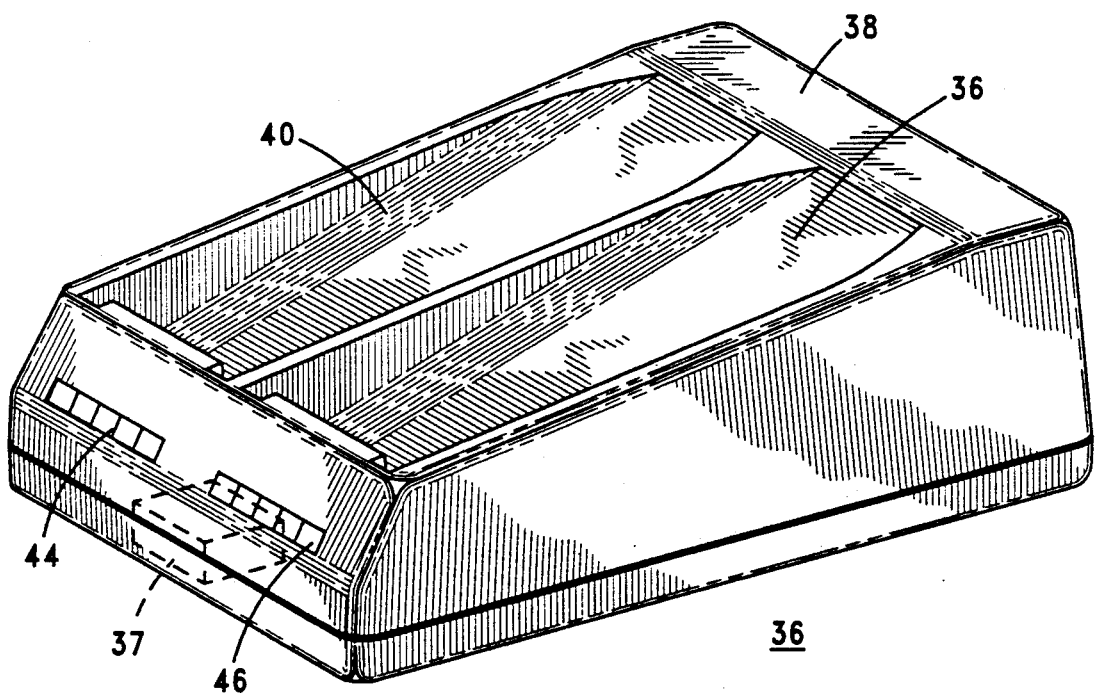
FIG. 2 is an orthographic illustration of a battery charger employing the present invention.

Turning now to the orthographic illustration of FIG. 2, there is illustrated a conventional battery charging apparatus, referred to generally by reference numeral 36, such as Motorola model number SLN2547A. The battery state of charge detector of the preferred embodiment of the present invention, indicated by block 37 in the Figure, is mounted to supportive housing 38 of battery charging apparatus 36 to be integral therewith. Supportive housing 38 forms pockets 40 and 42 to allow rechargeable batteries to be supportably positioned therein, and to be electrically coupled to electrical charging circuits (not illustrated). Rows 44 and 46 of light emitting diodes are mounted upon housing 38, and function to provide a visual indication of the state of charge of a battery undergoing charging in pocket 40 and/or 42 as detected by the battery state of charge detector of the present invention.

Figure 3:
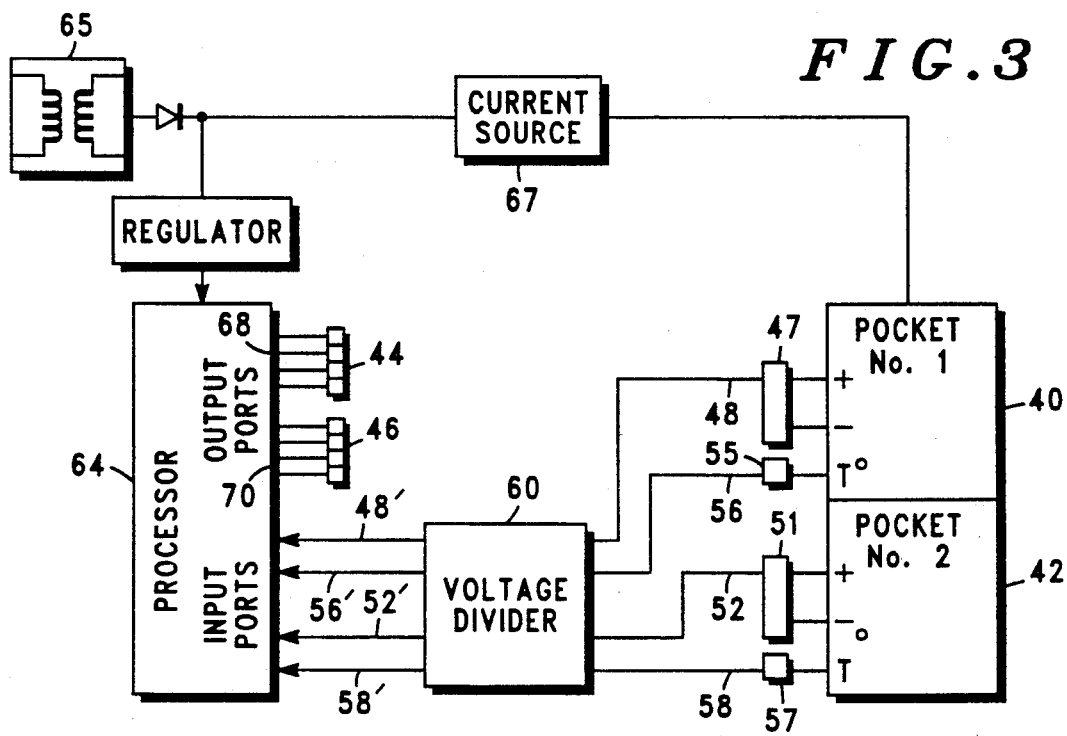
FIG. 3 is a block diagram of the battery state of charge indicator constructed according to the teachings of the present invention.

FIG. 3 illustrates a block diagram of the battery state of charge detector of the present invention. As previously mentioned, the battery state of charge detector may be positioned within supportive housing 38 of battery charging apparatus 36 of FIG. 2. The charge detector may, of course, alternately be a selfcontained unit, or be mounted to any of many other apparatus. Voltage levels across a battery positioned in pocket 40 are measured by voltage measuring means 47, and signals indicative of the measured voltage levels are supplied to line 48. Similarly, voltage levels measured across a battery positioned in pocket 42 are measured by voltage measuring means 51, and signals indicative of the measured voltage levels are supplied to line 52. The charge detector of the preferred embodiment further includes temperature measuring means 55 and 57 for measuring the temperature of the batteries in pockets 40 and 42, respectively, and for providing signals indicative of the measured battery temperatures on lines 56 or 58. The signals on lines 48, 52, 56, and 58 are supplied to voltage divider 60 which outputs signals on lines 48'-58' having a range of values suitable for input at input ports 62 of processor means 64. Also illustrated in block form in FIG. 3 are transformer 65 and voltage regulator 66 which provide processor 64 with power, and current source 67.

Processor means 64 contains suitable memory to store values representative of the battery characteristic charge curve 10 illustrated in FIG. 1. As noted previously, the normal battery characteristic charge curve 10 of FIG. 1 is representative of the charging pattern of a normal Nickel-Cadmium battery. However, the charge curve of any particular battery may differ somewhat, due to the particular battery characteristics resulting from variables such as battery age, battery manufacture, etc. As a result, voltage levels 26, 28, and 30 utilized to help define regions 16-24, which, in turn, define the state of charge of a battery, are modified. In essence, processor 64 modifies the charge curve 10 stored in processor memory to produce a modified charge curve 10 stored in processor memory to produce a modified charge curve representative of a particular battery, and one such modified charge curve 10M is shown in FIG. 1 in hatch.

Processor means 64 compares the measured voltage levels of the battery supplied thereto at input ports 62, and the rates of change thereof, with the values representative of battery charge curve 10 stored in the processor 64 memory, and then modifies values representative of the normal battery charge curve 10 responsive to variations of the actual battery charge condition characteristics from the normal battery charge curve. In the preferred embodiment of the present invention, signals indicative of battery temperature are utilized to further modify the values representative of battery charge curve 10, and thereby form modified normal charge curve 10M.

By modifying the values representative of the normal battery charge curve 10 in order to produce a battery charge curve representative of the battery being charged, processor means 64 may then define regions 16-24 with respect to a particular battery. The state of charge of the battery is detected by measuring voltage levels across the battery and by correlating the actual battery charge with a particular region 16-24 of FIG. 1. Such identification may be indicated by providing suitable outputs at output ports 68 and/or 70 to power indicating devices such as rows 44 and 46 of light emitting diodes illustrated in FIG. 2.

Figure 4:
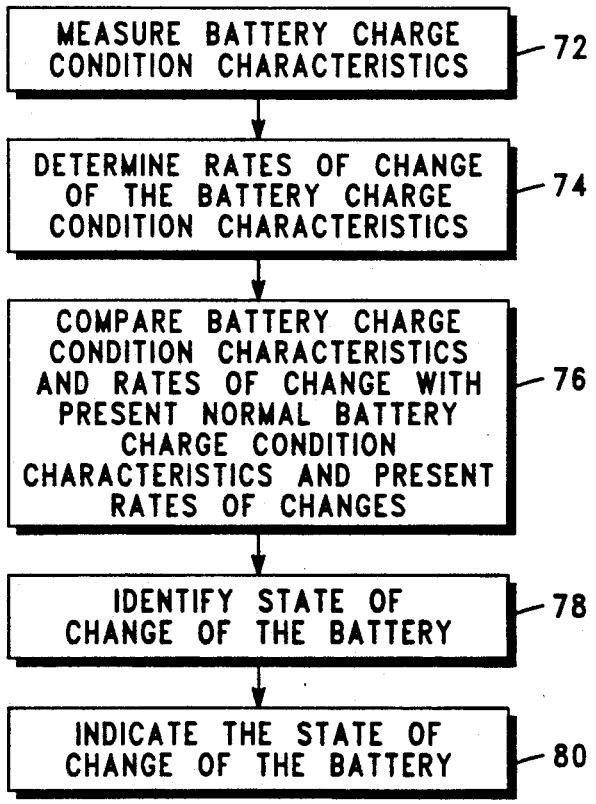
FIG. 4 is a flow diagram illustrating the steps employed in the method of the present invention.

Turning now to the flow diagram of FIG. 4, the method of the preferred embodiment of the present invention for detecting the state of charge of a battery during charging or discharging thereof is shown. The method of FIG. 4 may be embodied, for example, by an algorithm operable on processor 64 of FIG. 3. The method of the present invention includes the steps of measuring the actual battery charge condition characteristics, and determining rates of changes of the battery charge condition characteristics, indicated by blocks 72 and 74, respectively. As discussed previously, in the preferred embodiment, the battery charge condition characteristics are comprised of voltage levels measured across the battery and the battery temperature. Other battery charge condition characteristics indicative of the charge condition of the battery during charging or discharging thereof, may, of course, be alternately measured.

Next, as shown in block 76, the measured battery charge condition characteristics and the rates of changes thereof are compared with preset charge condition characteristics of a normal battery. Responsive to the comparison, the state of charge of the battery being charged or discharged is identified, indicated by block 78. In the preferred embodiment of the present invention, the method includes the further step, indicated by block 80, of indicating the state of charge of the battery identified during the step of identifying.

Figure 5:
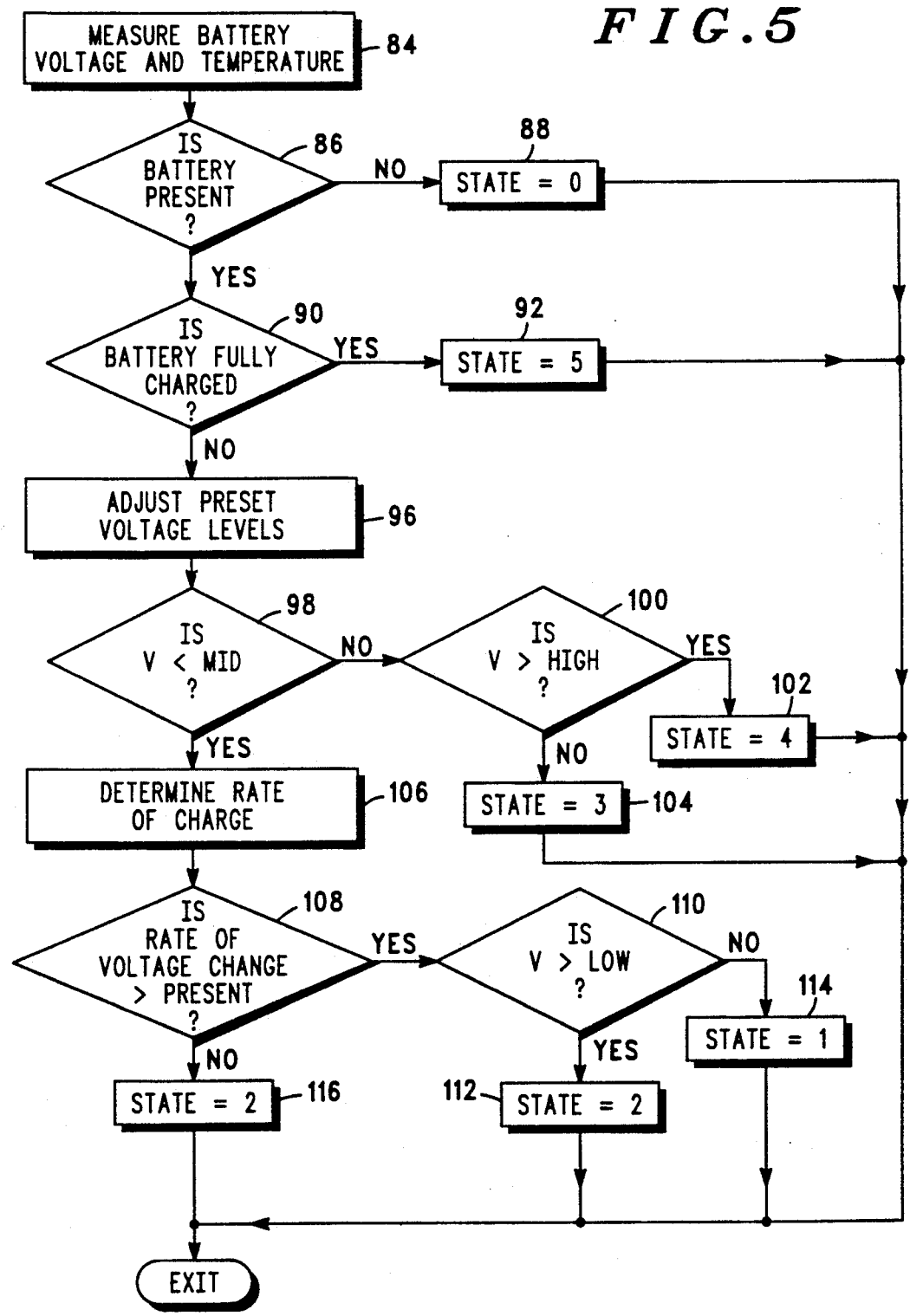
FIG. 5 is a flow diagram illustrating the steps of an algorithm embodied within a processor for implementing the preferred embodiment of the present invention.

FIG. 5 illustrates a flowchart representative of an actual algorithm embodied within processor 64 shown in FIG. 3 to detect the state of charge of a battery during charging thereof in a battery charger such as charging apparatus 36. While the flowchart illustrates the flow sequence for detecting the state of charge of a single battery (such as a battery positioned in either pocket 40 or 42 of apparatus 36), it is to be understood that detection of the state of charge of more than one battery may be determined by processor 64 through the use of appropriate switching techniques. It is to be further understood that the flowchart of FIG. 5 illustrates but one of many algorithms which may be embodied within processor 64 in order to perform the same function.

After initialization, the battery voltage levels and, preferably, the temperature level of the battery, are measured as indicated block 84. Decision block 86 determines whether the battery is present based upon the measured temperature and voltages. If the measured temperature and voltages indicates that no battery is present, the no branch is taken to block 88, whereat the state of charge is determined to be state 0 (States 1-5 shown in FIG. 5 correspond to first-fifth regions 16-24 of FIG. 1, and state 0 is a default indication). Otherwise, the yes branch is taken to to decision block 90. Decision block 90 determines whether the battery is already fully charged. If the battery is fully charged, the yes branch is taken to block 92, and the state of charge is determined to be state 5. Otherwise, the no branch is taken to block 96 whereat stored, preset values representative of the normal battery characteristic charge curve 10 are modified to form modified values representative of the actual battery characteristic charge curve 10M. The preset values include values representative of high, mid, and/or low voltage levels respectively, of curve 10 of FIG. 1.

It is to be noted that, because the preferred embodiment of the present invention utilizes the rate of change of the voltage level across the battery, in order to modify the preset values, at least two measurements of the battery voltage must be taken in order to determine the rate of change. Therefore, two of the battery voltage level measurements, indicated by block 84, must be taken in order to make the adjustments to the presets. Accordingly, the algorithm source code may provide means to skip, or otherwise not implement, the logic block indicated by block 96, until the algorithm has performed the measurements of block 84 at least two times.

Decision block 98 determines whether the measured voltage level is less than the modified value of mid voltage 28. If not, the no branch is taken to decision block 100, whereat a determination is made as to whether the measured voltage level is greater than the modified value of high voltage. If yes, the yes branch is taken to block 102, where a determination is made that the state of charge is state 4. Otherwise, the no branch is taken to block 104, and the state of charge is determined to be state 3.

If the determination at decision block 98 indicated that the measured voltage level was less than the modified mid voltage level, the yes branch is taken to block 106, and the rate of change of the measured voltage is determined. Again, it is to be noted that the battery voltage levels must be measured two times in order to determine the rate of change thereof. Accordingly, the algorithm source code may provide means to skip, or otherwise not implement, the logic block indicated by block 106 until the algorithm has performed the measurements of block 84 at least two times.

Decision block 108 determines whether the rate of change is greater than a preset value. If yes, the yes branch is taken to decision block 110. Decision block 110 determines whether the measured voltage level is greater than the modified low voltage level. If yes, the yes branch is taken to block 112 where a determination is made that the state of charge is state 2. Otherwise, the no branch is taken to block 114 where a determination is made that the state of charge is state 1. If the determination at block 108 indicated that the rate of change was less than a preset value, the no branch is taken to block 116 whereat a determination is made that the state of charge is 2.

The algorithm implementing the flowchart of FIG. 5 is repeated in order to continuously update the detection of the state of charge of the battery.

The actual state of charge of the battery during charging thereof may be indicated by providing appropriate outputs to power an output indicating device, such as row 44 or 46 of light emitting diodes.

The method and apparatus of the present invention thereby allows an accurate indication of the actual state of charge of a battery during charging thereof. Because the state of charge of the battery is determined not merely by measuring voltage levels of a battery during charging thereof, but, rather, compares the measured battery charge condition characteristics with a normal battery characteristic charge curve, an accurate indication of the state of charge of a battery during charging or discharging thereof may be obtained.

Figure 6:
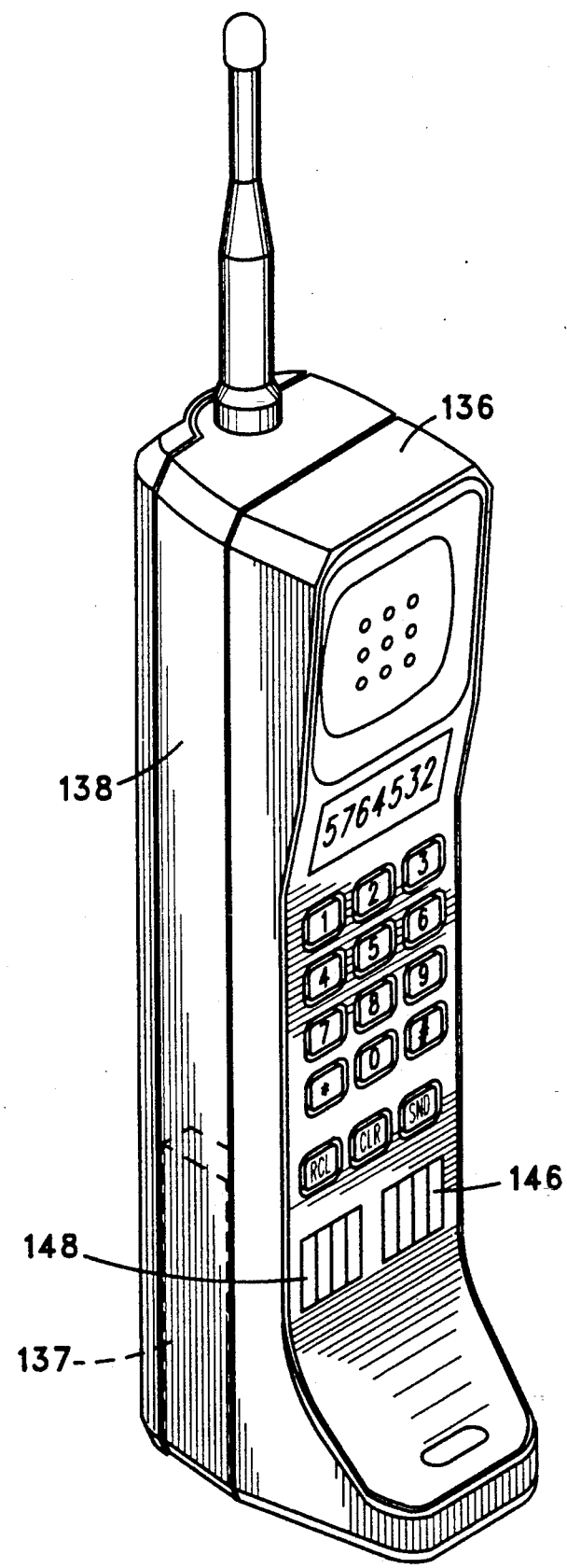
FIG. 6 is an orthographic illustration of a transceiver employing the present invention.

FIG. 6 illustrates a transceiving device, such as Motorola cellular phone, model number F09NFD8444AA, referred to generally by reference numeral 136. The battery state of charge detector of the preferred embodiment of the present invention, indicated by block 137 in the Figure, is mounted to housing 138 of the transceiver 136. Transceiver 136 is powered by a battery power source supported within housing 138 and carried therewith. Operation of transceiver 136 discharges the battery, and the state of charge of the battery, as detected by detector 137, may be visually indicated by suitable connection of outputs of detector 137 to rows 144 and 146 of light emitting diodes.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A battery state of charge detector for a battery charger having at least one charging pocket, the battery charger operative to apply a charging current to a battery when positioned at the charging pocket of the battery charger, said battery state of charge detector comprising:

means, forming a portion of the battery charger, for storing values representative of voltage levels taken across output terminals of a normal battery during application of a charging current, said values, when plotted as a function of time, for forming a normal battery charging curve;

means, connected across the at least one charging pocket of the battery charger, for measuring voltage levels taken across output terminals of the battery when positioned at the charging pocket of the battery charger during application of the charging current to the battery;

means, coupled to receive signals indicative of the voltage levels measured by said means for measuring, for calculating rates of change of the voltage levels measured by said means for measuring;

means, coupled to receive signals indicative of the rates of change calculated by said means for calculating and the signals indicative of the voltage levels measured by said means for measuring for modifying the values representative of the voltage levels of the normal battery which form the normal battery charging curve when plotted as a function of time, said means for modifying operative to form thereby modified values which, when plotted as a function of time, form a modified battery charging curve;

means, coupled to receive the signals indicative of the voltage levels measured by said means for measuring and signals indicative of the modified values formed by said means for modifying, for determining the battery state of charge by correlating a voltage level taken across output terminals of the battery with a point on the modified battery charging curve formed of a plot, taken as a function of time, of the modified values formed by the means for modifying.

2. The detector of claim 1 further comprising means, coupled to receive signals indicative of the battery state of charge determined by said means for determining, for indicating the state of charge of the battery in human perceptible form.

3. The detector of claim 1 wherein said means for modifying is comprised of a microprocessor having an algorithm embodied therein.

4. A method for detecting the state of charge of a battery undergoing application of a charging current, said method comprising the steps of:

storing values representative of voltage levels taken across output terminals of a normal battery during application of a charging current thereto to form thereby a normal battery charging curve;

measuring voltage levels taken across said battery undergoing application of the charging current;

calculating rates of change of the voltage levels measured during said step of measuring;

modifying the values representative of the voltage levels of the normal battery which form the normal battery charging curve responsive to at least one rate of change calculated during said step of calculating and at least one measured voltage level measured during said step of measuring; and determining the battery state of charge by correlating a voltage level taken across output terminals of the battery with a point on the modified battery charging curve.

5. The method of claim 4 wherein the normal battery charging curve formed during said step of storing defines charge state regions, wherein each of said charge state regions corresponds to a portion of a battery charging curve and wherein said charge state regions represent state of charge of the battery charging curve.

6. The method of claim 4 comprising the further step of measuring temperature levels of the battery.

7. The method of claim 4 comprising the further step of indicating the state of charge of the battery determined during the step of determining in human perceptible form.

* * * * *